United States Patent
Xiong et al.

(10) Patent No.: US 10,962,109 B2
(45) Date of Patent: Mar. 30, 2021

(54) SERVO

(71) Applicant: UBTECH ROBOTICS CORP LTD, Shenzhen (CN)

(72) Inventors: Youjun Xiong, Shenzhen (CN); Wenhua Fan, Shenzhen (CN); Zhongliang Wang, Shenzhen (CN); Hanyu Sun, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 0 days.

(21) Appl. No.: 16/447,982

(22) Filed: Jun. 21, 2019

(65) Prior Publication Data

US 2020/0191263 A1 Jun. 18, 2020

(30) Foreign Application Priority Data

Dec. 12, 2018 (CN) .......................... 201811515543.1

(51) Int. Cl.
*F16H 61/32* (2006.01)
*F16H 59/02* (2006.01)
*F16H 59/44* (2006.01)

(52) U.S. Cl.
CPC .......... *F16H 61/32* (2013.01); *F16H 59/0217* (2013.01); *F16H 2059/443* (2013.01); *F16H 2061/323* (2013.01)

(58) Field of Classification Search
CPC ...... F16H 61/32; F16H 59/02; F16H 59/0217; F16H 2059/443; F16H 2061/323; H02K 7/14; H02K 11/33; H02K 7/116; H02K 2211/03; H02K 11/22; H02K 11/215
See application file for complete search history.

(56) References Cited

U.S. PATENT DOCUMENTS

| 2009/0146646 A1* | 6/2009 | Malich | H02K 7/116 |
| | | | 324/207.13 |
| 2015/0053040 A1* | 2/2015 | Ueda | H02K 11/33 |
| | | | 74/490.03 |
| 2018/0183303 A1* | 6/2018 | Du | H02K 7/003 |
| 2019/0181719 A1* | 6/2019 | Xiong | B25J 9/126 |
| 2019/0326838 A1* | 10/2019 | Dion | F04B 23/02 |

FOREIGN PATENT DOCUMENTS

| CN | 206582286 U | 10/2017 |
| CN | 108679203 A | 10/2018 |

* cited by examiner

*Primary Examiner* — Naishadh N Desai

(57) ABSTRACT

A servo includes a motor having a rotating shaft, an output shaft disposed apart from the rotating shaft, a transmission mechanism to transmit mechanical power from the motor to the output shaft, a circuit board, a first detected member fixed to an end of the rotating shaft, a second detected member fixed to an end of the output shaft adjacent to the circuit board; and a first detecting member and a second detecting member mounted on the circuit board and configured to respectively detect rotational angles of the rotating shaft and the output shaft, based on changes caused by rotation of the first detected member and the second detected member.

17 Claims, 1 Drawing Sheet

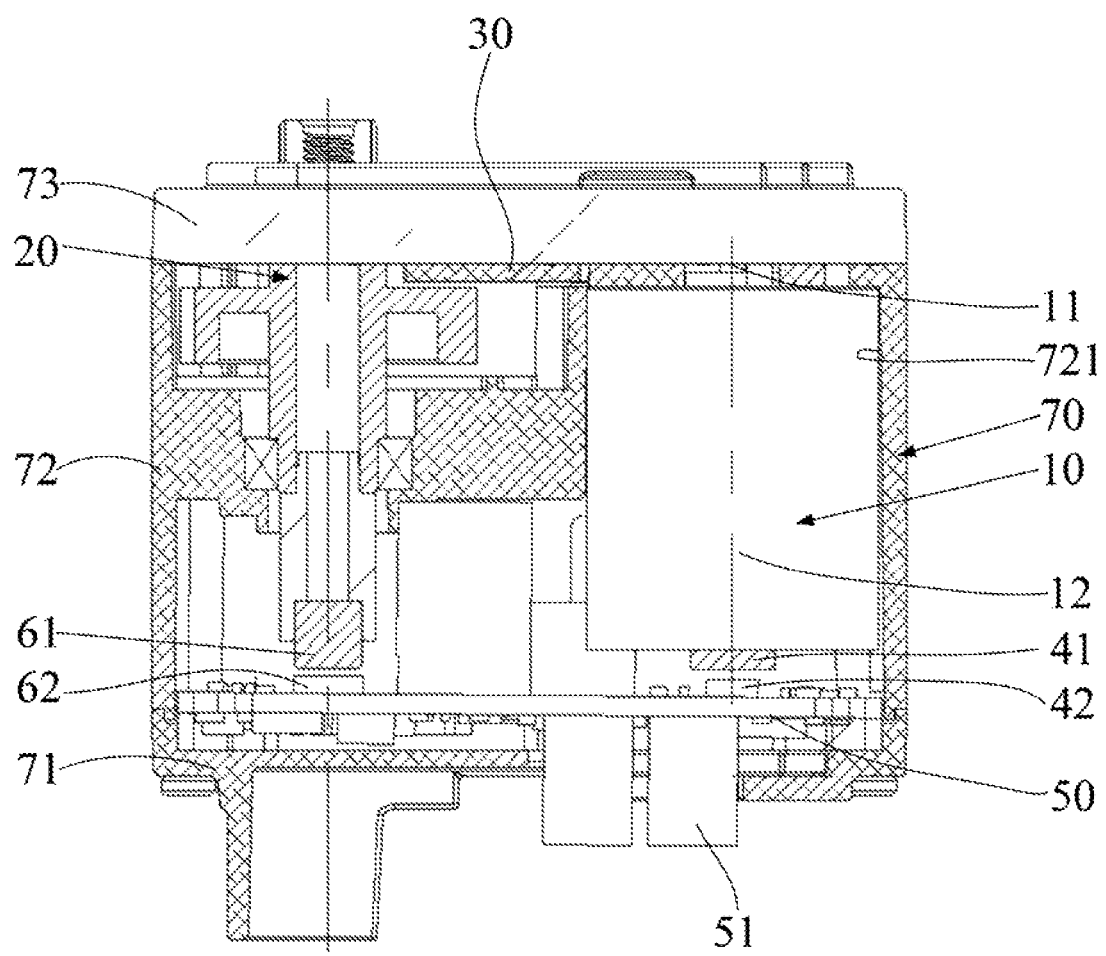

SERVO

CROSS REFERENCE TO RELATED APPLICATIONS

This application claims priority to Chinese Patent Application No. 201811515543.1, filed Dec. 12, 2018, which is hereby incorporated by reference herein as if set forth in its entirety.

BACKGROUND

1. Technical Field

The present disclosure generally relates to servos, and particularly to a compact servo.

2. Description of Related Art

Generally, some conventional servos include a motor, a position sensor, and a transmission mechanism. The position sensor is needed when the motor is a brushless motor because the rotational position of the rotating shaft of the motor needs to be detected in real time in order to correctly control the motor. The position sensor is generally arranged within the motor. One problem with such arrangement is that it is not conducive to the minimization of the size of the motor.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

The drawing is a schematic cross-sectional view of a servo accruing to an embodiment.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Referring to the drawing, in one embodiment, a servo includes a motor 10 having a rotating shaft 11, an output shaft 20 disposed apart from the rotating shaft 11, and a transmission mechanism 30 that transmits mechanical power from the motor 10 to the output shaft 20. The servo further includes a circuit board 50 electrically connected to the motor 10, a first detected member 41 fixed to an end of the rotating shaft 11, and a second detected member 61 fixed to an end of the output shaft 20 adjacent to the circuit board 50. The servo further includes a first detecting member 42 and a second detecting member 62 mounted on the circuit board 50 and used to respectively detect rotational angles of the rotating shaft 11 and the output shaft 20, based on changes caused by rotation of the first detected member 41 and the second detected member 61. The first detecting member 42 and the second detecting member 62 respectively face the first detected member 41 and the second detected member 61.

In the embodiment, the motor 10 is a brushless motor and needs to detect the angular position of the rotating shaft 11 in real time during operation. The rotating shaft 11 is a rotor of the motor 10. The first detected member 41 is fixed to the rotating shaft 11 of the motor 10, and the first detecting member 42 is arranged on the circuit board 50. The first detected member 41 is spaced apart from the first detecting member 42 by a certain distance. Such an arrangement simplifies the design and assembly of the motor 10. Since the circuit board where the first detecting member is arranged is not arranged within the motor 10, the size of the motor 10 becomes smaller, allowing the servo to be compact because the motor 10 requires less space. Since the first detecting member is arranged outside the motor 10, the heat dissipation performance of the motor 10 is improved, which is advantageous for improving the working efficiency of the motor 10.

In one embodiment, the transmission mechanism 30 includes a number of gear sets. The transmission mechanism 30 has a predetermined gear ratio that effects a rotational output of the output shaft 20 in a predetermined range. The transmission mechanism 30 is arranged between the rotating shaft 11 and the output shaft 20. The axis around which the rotating shaft 11 rotates and the axis around which the output shaft 20 rotates are arranged in parallel with each other, which facilitates the arrangement of the transmission mechanism 30 to make the overall structure compact. The circuit board 50 is electrically connected to the motor 10 and can control the motor 10.

In one embodiment, the motor 10 further includes a casing 12, and the rotating shaft 11 includes an upper end and a lower end that protrude out of the casing 12. The transmission mechanism 30 is arranged between the upper end of the rotating shaft 11 and the output shaft 20, which allows mechanical power to be transmitted from the rotating shaft 11 to the output shaft 20. The first detected member 41 is fixed to the lower end. This compact structure facilitates the arrangement of the transmission mechanism 30, the first detected member 41 and the circuit board 50 arranged apart from the first detected member 41. The gear sets are 4-stage reduction gears for speed reduction and increased torque. The upper end of the rotating shaft 11 is provided with a gear, which are engaged with the primary gear of the gear sets. The primary gear is engaged with the secondary gear, which is engaged with the third gear. The third gear is engaged with the fourth gear to which the output shaft 20 is coaxially fixed.

In one embodiment, the first detected member 41 is a flat cylindrical magnet, and the first detecting member 42 is a magnetic encoding chip for detecting a change in a magnetic field of the first detected member 41. The rotation axis around which the rotating shaft 11 rotates extends through a center of the first detecting member 42 and a center of the first detected member 41. The first detected member 41 rotates together with the rotating shaft 11 of the motor 10, and the first detecting member 42 detects a change in the magnetic field of the first detected member 41, thereby detecting the rotational angle of the rotating shaft 11. The first detected member and the first detecting member may also be other types of sensors for detecting the rotational angle, such as a grating encoder and an inductor encoder. For a grating encoder, the code wheel is fixed on the motor shaft, and defines a number of slots arranged along the circumferential direction. The signal transceiver device is mounted on a circuit board. The light source and the light sensor are arranged on opposite sides of the code wheel. The light from the light source first passes through a lens and then passes through one of the slots of the code wheel, and is received by two light receiving elements. After signal processing, the rotational angle of the motor shaft is determined.

In one embodiment, the second detected member 61 is fixed to the end of the output shaft 20 away from the transmission mechanism 30, and the first detecting member 42 and the second detecting member 62 are spaced apart from each other.

In one embodiment, the second detected member 61 is a flat cylindrical magnet, and the second detecting member 62 is a magnetic encoding chip for detecting a change in a magnetic field of the first detected member 61. The rotation axis around which the output shaft 20 rotates extends through a center of the second detecting member 62 and a center of the second detected member 61. The second detected member 61 rotates together with the output shaft 20, and the second detecting member 62 detects a change in the magnetic field of the second detected member 61, thereby detecting the rotational angle of the output shaft 20. The second detected member and the second detecting member may also be other types of sensors for detecting the rotational angle.

In one embodiment, the servo further includes a housing 70. The motor 10, the output shaft 20, the transmission mechanism 30 and the circuit board 50 are mounted to the housing 70.

In one embodiment, the housing 70 includes a lower housing 71, a middle housing 72 connected to the lower housing 71, and an upper housing 73 connected to the middle housing 72. The transmission mechanism 30 and the motor 10 are located in the middle housing 72. The circuit board 50 is located in the middle housing 72 and the lower housing 71. The upper housing 73 defines a through hole through which the output shaft 20 passes. The lower housing 71, the middle housing 72, and the upper housing 73 are connected together by fasteners. The lower housing 71 is provided with a socket 51 electrically connected to the circuit board 50 for facilitating power supply to the circuit board 50.

In one embodiment, the middle housing 72 defines a chamber 721 for receiving the motor 10.

In one embodiment, the servo further includes a servo disc (not shown) fixed to an end of the output shaft 20 that is away from the circuit board 50. The output shaft 20 and the servo disc are connected to each other by splined connection.

In one embodiment, the circuit board 50 includes a controller, a motor driver and a power supply module.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A servo comprising:
   a casing;
   a motor comprising a rotating shaft having an upper end and a lower end;
   an output shaft disposed apart from the rotating shaft;
   a transmission mechanism configured to transmit mechanical power from the motor to the output shaft, the transmission mechanism arranged between the upper end of the rotating shaft and the output shaft;
   a circuit board;
   a first detected member fixed to the lower end of the rotating shaft;
   a second detected member fixed to an end of the output shaft adjacent to the circuit board; and
   a first detecting member and a second detecting member mounted on the circuit board and configured to respectively detect rotational angles of the rotating shaft and the output shaft, based on changes caused by rotation of the first detected member and the second detected member, the first detecting member and the second detecting member respectively facing the first detected member and the second detected member.

2. The servo according to claim 1, wherein the first detected member is a magnet, the first detecting member is a magnetic encoding chip for detecting a change in a magnetic field of the first detected member, and a rotation axis around which the rotating shaft rotates extends through a center of the first detecting member and a center of the first detected member.

3. The servo according to claim 1, wherein the second detected member is fixed to the end of the output shaft away from the transmission mechanism, and the first detecting member and the second detecting member are spaced apart from each other.

4. The servo according to claim 3, wherein the second detected member is a magnet, the second detecting member is a magnetic encoding chip for detecting a change in a magnetic field of the second detected member, and a rotation axis around which the output shaft rotates extends through a center of the second detecting member and a center of the second detected member.

5. The servo according to claim 1, further comprising a housing, wherein the motor, the output shaft, the transmission mechanism and the circuit board are mounted to the housing.

6. The servo according to claim 5, wherein the housing comprises a lower housing, a middle housing connected to the lower housing, and an upper housing connected to the middle housing, the transmission mechanism and the motor are located in the middle housing, and the circuit board is located in the middle housing and the lower housing, the upper housing defines a through hole through which the output shaft passes.

7. The servo according to claim 6, wherein the middle housing defines a chamber for receiving the motor.

8. The servo according to claim 1, further comprising a servo disc fixed to an end of the output shaft that is away from the circuit board.

9. The servo according to claim 1, wherein the circuit board comprises a controller, a motor driver and a power supply module.

10. A servo comprising:
    a motor comprising a rotating shaft;

an output shaft disposed apart from the rotating shaft;

a transmission mechanism configured to transmit mechanical power from the rotating shaft to the output shaft;

two detected members fixed to the rotating shaft and the output shaft; and two detecting members facing the two detected members, the two detecting members configured to respectively detect rotational angles of the rotating shaft and the output shaft, based on changes caused by rotation of the two detected members.

11. The servo according to claim 10, wherein a first of the detected members is a magnet, a first of the detecting members is a magnetic encoding chip for detecting a change in a magnetic field of the first of the detected members, and a rotation axis around which the rotating shaft rotates extends through a center of the first of the detecting members and a center of the first of the detected members.

12. The servo according to claim 10, wherein a second of the detected members is fixed to an end of the output shaft away from the transmission mechanism, and the two detecting members are spaced apart from each other.

13. The servo according to claim 12, wherein the second of the detected members is a magnet, a second of the detecting members is a magnetic encoding chip for detecting a change in a magnetic field of the second of the detected members, and a rotation axis around which the output shaft rotates extends through a center of the second of the detecting members and a center of the second of the detected members.

14. The servo according to claim 10, further comprising a housing, wherein the motor, the output shaft and the transmission mechanism are mounted to the housing.

15. The servo according to claim 14, wherein the housing comprises a lower housing, a middle housing connected to the lower housing, and an upper housing connected to the middle housing, the transmission mechanism and the motor are located in the middle housing, and the upper housing defines a through hole through which the output shaft passes.

16. The servo according to claim 15, wherein the middle housing defines a chamber for receiving the motor.

17. The servo according to claim 10, further comprising a servo disc fixed to an end of the output shaft.

\* \* \* \* \*